(12) United States Patent
Yamashita et al.

(10) Patent No.: US 6,623,542 B2
(45) Date of Patent: Sep. 23, 2003

(54) SLIDE MEMBER

(75) Inventors: Atsuko Yamashita, Aichi-ken (JP);
Yoshinori Itou, Aichi-ken (JP);
Fuminori Satoji, Tokyo-to (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/983,226

(22) Filed: Oct. 23, 2001

(65) Prior Publication Data

US 2002/0048527 A1 Apr. 25, 2002

(30) Foreign Application Priority Data

Oct. 23, 2000 (JP) ........................ 2000-322687

(51) Int. Cl.[7] .............................. B22F 3/10; C22C 1/08; C22C 33/02
(52) U.S. Cl. .............................. 75/243; 75/246; 75/247; 419/2
(58) Field of Search ................ 419/36, 37, 2; 75/243, 230, 246, 247

(56) References Cited

U.S. PATENT DOCUMENTS

| 4,596,692 | A | * | 6/1986 | Morishita et al. ............... 419/7 |
| 4,608,317 | A | * | 8/1986 | Kobayashi et al. .......... 428/546 |
| 5,531,943 | A | * | 7/1996 | Sudani et al. ............... 264/29.1 |
| 5,698,800 | A | * | 12/1997 | Hoshino et al. ............... 75/230 |
| 5,824,923 | A | * | 10/1998 | Kondoh et al. ............... 75/247 |
| 6,299,664 | B1 | * | 10/2001 | Matsumoto et al. .......... 75/246 |

* cited by examiner

Primary Examiner—Daniel J. Jenkins
(74) Attorney, Agent, or Firm—Arent Fox Kintner Plotkin & Kahn

(57) ABSTRACT

The slide member 5 slidably guided on the outer peripheral surface of a shaft is formed by adding 10–50% by volume of thermosetting resin to a metal powder consisting mainly of copper powder, iron powder or a mixture thereof and sintering the same at temperatures not less than the sintering temperature of the metal powder.

9 Claims, 4 Drawing Sheets

TIME (sec)

TIME (sec)

SLIDE MEMBER

BACKGROUND OF THE INVENTION

1. Field of the Invention

The present invention relates to a slide member adapted to perform linear motion along a shaft, and is suitable for a slide member which is installed in the information equipment, for example, in the carriage of a printer.

2. Description of Prior Art

The carriage instilled in a printer performs linear motion as guided by one or more shafts, and to guide this carriage in linear motion, the carriage is provided with a bearing (slide member) which slides on the outer peripheral surface of said shaft. Conventional slide member of this type is generally made of resin (100% resin) or an oil-impregnated sintered alloy (100% metal).

In recent years, there has been a trend toward a strong desire for calmness during printer operation, and correspondingly thereto, further noise reduction is required of the slide member which is one source of noise. Further, in a slide member made of resin, since it is formed by injection molding or machining such as cutting, problems pointed out are that high dimensional accuracy can hardly be attained and that the cost is high.

SUMMARY OF THE INVENTION

Accordingly, an object of the invention is to provide a slide member having such features as low noise, producibility with good accuracy, and low costs.

To achieve the above object, according to the invention, the slide member slidably guided on the outer peripheral surface of a shaft is made by adding thermosetting resin to a metal powder consisting mainly of copper powder, iron powder or a mixture thereof, and sintering the same.

As the slide member is made by adding thermosetting resin to a metal powder, and sintering the same, as described, the presence of the resin improves the damping property, eliminating the echoing of sound and the accentuation of sliding sound as is the case with the conventional sintered oil-impregnated bearing (100% metal), thus making it possible to suppress the sliding sound produced during linear motion so as to secure a high degree of calmness. Further, being a sintered body allows shaping to a predetermined size as by press-forming after sintering, thus achieving increased accuracy and reduced costs as compared with the resin bearing which requires machining or injection molding.

Said mixture of a metal powder and resin is desirably sintered at temperatures not less than the carbonization temperature of the resin, whereby a slide member which is high in hardness and in strength is obtained.

Use of a thermosetting resin which is of the hot-melt type, that is, having the property to set after it is melted by heating (hot-melt self-setting property) provides increased strength.

Adding tin or copper to said metal powder and subjecting the same to the liquid phase sintering results in increased strength being obtained since the additive metal serves as a binder.

The thermosetting resin is added preferably in an amount of 10–50% by volume. The porosity of the slide member is set preferably to 5–40% by volume. This range ensures that lubricating oil necessary for lubrication can be held stably in a long time, prolonging the life of the slide member.

The compacted body of said mixture is shaped after sintering This process is economical as it needs no cutting operations and yet high dimensional accuracy is attained.

The slide member should have an axial groove in the inner diameter region This groove functions as an oil sump, ensuring that ample oil is held between the shaft and the slide member, improving lubricity.

A carriage having the slide member described above has a high degree of calmness and is guided with high accuracy, so that the operational stability is high, and yet the cost is low.

DETAILED DESCRIPTION OF THE PREFERRED EMBODIMENTS

An embodiment of the invention will now be described with reference to FIGS. 1 through 6.

Figure 1:
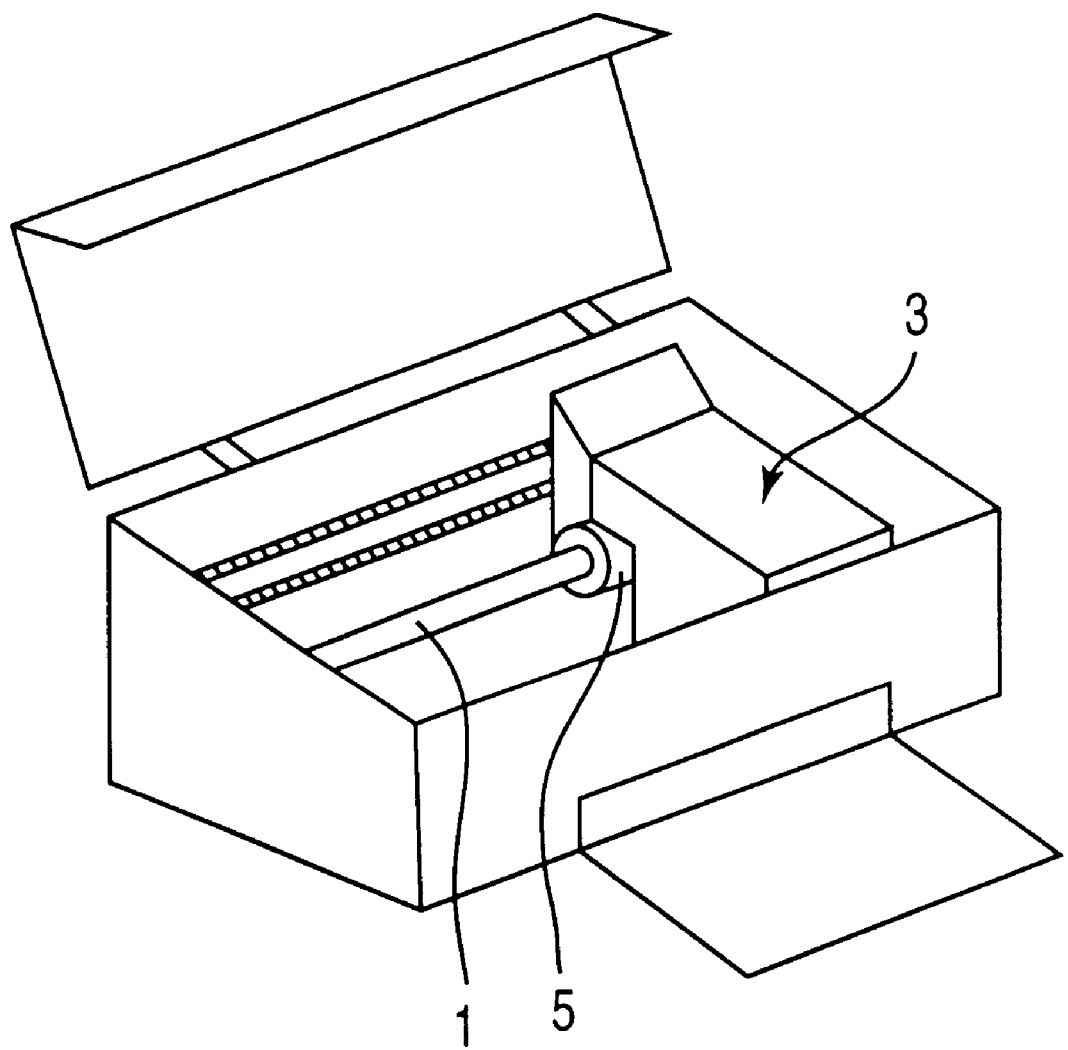
FIG. 1 is a perspective view showing the drive section of a printer.

FIG. 1 schematically shows the driving mechanism of a printer (for example, a color printer), wherein a carriage 3 guided by one or more shafts 1 is driven by a drive source, such as a motor (not shown), to perform a linear motion. The carriage 3 has a cylindrical slide member 5 mounted thereon to serve as a linear bearing and the shaft 1 is received by the inner peripheral surface of the slide member 5. The fact that the inner peripheral surface (slide portion 6) of the slide member 5 is guided by the outer peripheral surface of the shaft 1 results in the linear motion of the carriage 3 being guided.

Figure 2:
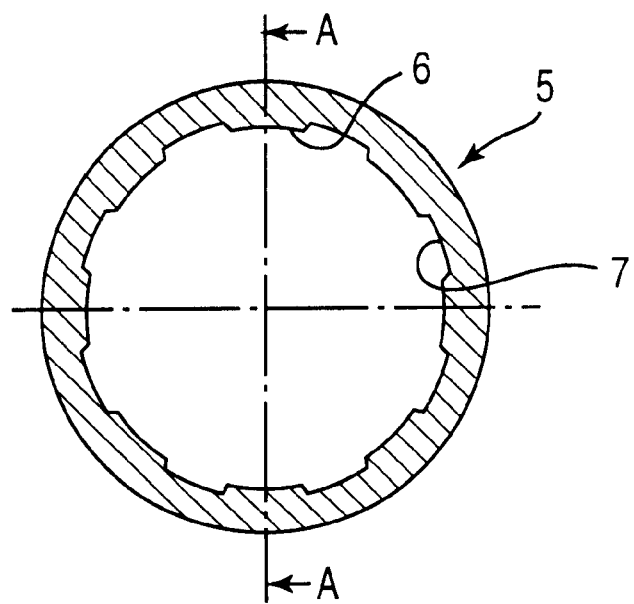
FIG. 2 is a cross-sectional view of a slide member.
Figure 3:
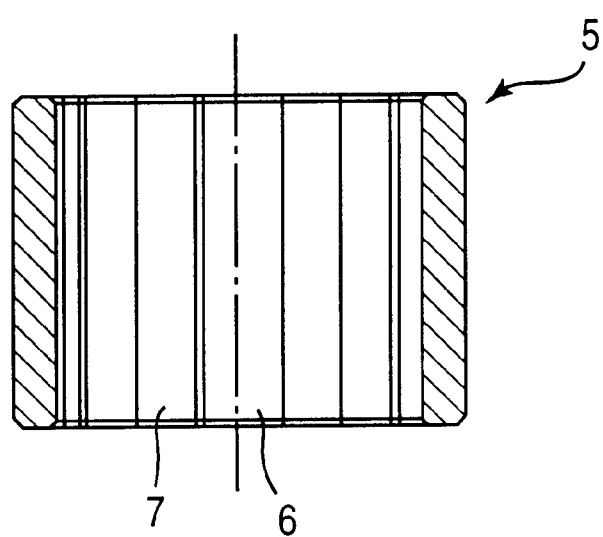
FIG. 3 is a sectional view taken along the line A—A in FIG. 2.

FIGS. 2 and 3 show a cross section and a longitudinal section, respectively, of the slide member 5. The inner peripheral surface of the slide member 5 is formed with one or more axial grooves 7 serving as oil sumps. It is desirable that eight or nine such grooves 7 be provided at circumferentially equally spaced intervals, but in the illustrated example, eight grooves are shown by way of example. Oil seeping from within the slide member 5 collects in the grooves 7, so that the friction between the slide member 5 and the shaft 1 is reduced to achieve low torque not only during operation but also immediately after sliding. If the grooves are too shallow, sufficient oil will not collect while if they are too deep, this leads to a decrease in the strength of the slide member 5, etc.; thus, the depth is set to a range of about 0.05–0.50 mm.

The slide member 5 is a sintered body made by sintering a metal powder consisting mainly of copper powder, iron powder or a mixture thereof.

In the present invention, in the process of producing the slide member 5, powder of thermosetting resin is mixed with said metal powder. For the thermosetting resin, use is made of a resin which is of the hot-melt type, that is, having the property to set after it is melted by-heating. Above all, hot-melt self-setting phenol resins are preferable as they are superior in wear resistance and in frictional property, and in particular, high polymer phenol resins having an average molecular weight of nor less than 10,000 (for example, "BELL PEARL" (trade name) of Kanebo Ltd.) yielded preferable results from the standpoint of strength. The mixing proportion of said resin powder should be 10–50% by volume. The reason is that an amount less than 10% by volume fails to provide sufficient improvement in attenuation property while an amount greater than 50% by volume results in a relative decrease in the metal component, failing to provide sufficient strength. In addition, non-melt thermosetting resins (which set without being melted by heating) are not preferable for the invention.

Addition of tin or copper powder as a binder to said metal powder makes it possible to further increase the strength. Ordinarily, tin is used for addition to the copper system consisting mainly of copper powder and to the copper-iron system consisting mainly of copper powder and iron powder, while copper is used for addition to the iron type consisting mainly of iron powder.

Said mixture consisting of a metal powder, a resin powder and a binder is compression-molded as by a press and then sintered at temperatures not less than the temperature at which said resin carbonizes. The sintering, which in this case produces a liquid phase as the binder melts during sintering, takes the form of so-called liquid phase sintering in which sintering proceeds in the liquid-solid mixed state. The resin in the mixture is carbonized and burnt as the sintering proceeds, so that it is possible to improve the sliding characteristics of the slide member 5 and to attain increased strength. When said high polymer phenol resin is used as a resin powder, for example, carbonization can be stably effected by setting the sintering temperature to not less than 600° C. (preferably not more than 1,150° C.).

The resulting sintered body is shaped to a predetermined size by being put in a mold and pressurized again. While this recompression collapses pores, it is desirable that the porosity after recompression be set within the range of 5–40% by volume. The porosity is the percentage by volume of pores in the sintered body and its size determines the oil content of the slide member 5. If the porosity is less than 5% by volume, the amount of oil held in the interior becomes insufficient, leading to a decrease in lubricity, while if it is greater than 40% by volume, the oil holding power lowers, so that the amount of exuded oil becomes too much, lowering durability. Further, if the air permeability of the sintered body after recompression is too low, oil films hardly form, while it is too high, the oil film strength lowers; thus, it is preferably set within the range of $1 \times 10^{-10}$–$1 \times 10^{-12}$ cm². The "air permeability" means the size of vent holes calculated from the measured values of the velocity and pressure of the fluid passing through the sintered body.

The sintered body is subjected to heat treatment and/or surface treatment after shaping and then to further impregnation with lubricating oil, according to need, thereby providing the slide member 5 shown in FIGS. 2 and 3. As for the lubricating oil, synthetic hydrocarbon type lubricating oil, for example, "FROIL 946P" (trade name) of Kanto Kasei Kogyo Co. Ltd, or the like may be used.

Figure 4A:
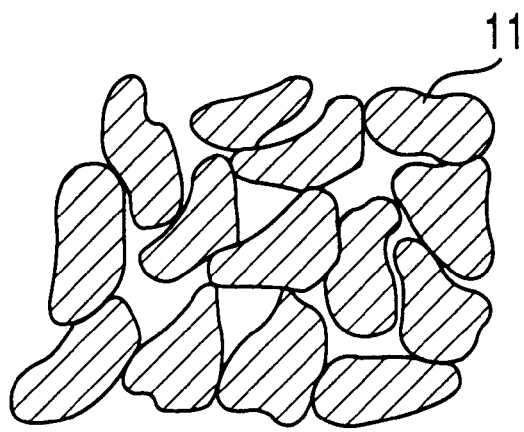
FIG. 4a schematically shows the structure of the sintered body of the conventional article.
Figure 4B:
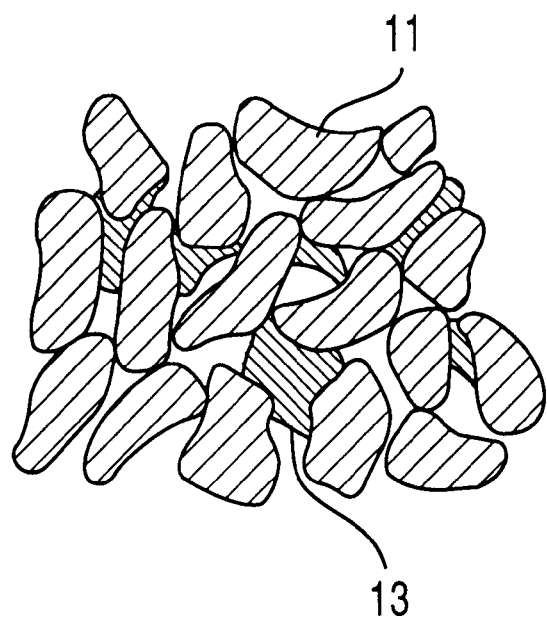
FIG. 4b schematically shows the structure of the sintered body of the present inventive article.

The slide member 5 produced through said process, as shown in FIG. 4b, contains metal particles 11 and carbonized resin 13, the latter filling the gaps between metal particles 11. In this case, the presence of the resin 13 increases the attenuation effect as compared with the sintered body (see FIG. 4a) which has no resin mixed therein, making it possible to suppress the echoing of sliding sound during operation and to obtain a high degree of calmness. Further, since production is realized after mixing of metal powder and resin powder as described above through the steps molding→sintering→shaping, accurate slide members can be obtained at low cost as compared with the conventional resin bearing which is produced, after mixing of resin powder, by compression molding and machining or by injection molding.

In order to ascertain the effect of suppression of sliding sound of thee present inventive article, comparative tests were conducted as to the attenuation waveforms of ① the present inventive article and ② the reference article.

Mixing proportion of resin powder . . . ① 30% by volume and ② 0% by volume.

Kind of resin powder . . . ① hot-melt self-setting phenol resin and ② none.

Material . . . ① copper+tin (with liquid phase sintering included) and ② copper+tin (with liquid phase sintering included).

Sintering temperature . . . ① 600° C.–1,000° C. and ② 600° C.–1,000° C.

Air permeability . . . ① $1.1 \times 10^{-10}$ cm² and ② $1.1 \times 10^{-10}$ cm².

Density . . . ① 6.1 g/cm³ and ② 6.6 g/cm³.

Size . . . each is 6 mm (inner diameter)×12 mm (outer diameter)×6 mm (length).

Figure 5:
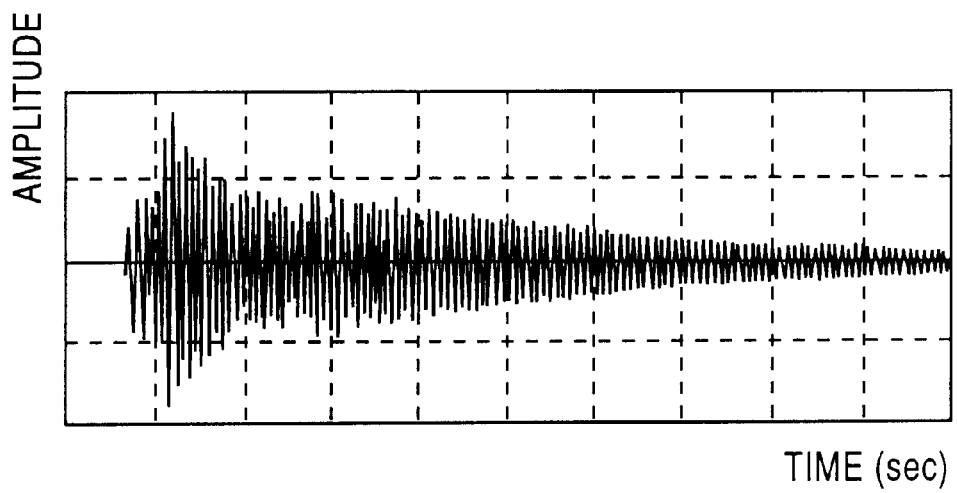
FIG. 5 is a graph showing the free oscillation attenuation waveform of the conventional article.
Figure 6:
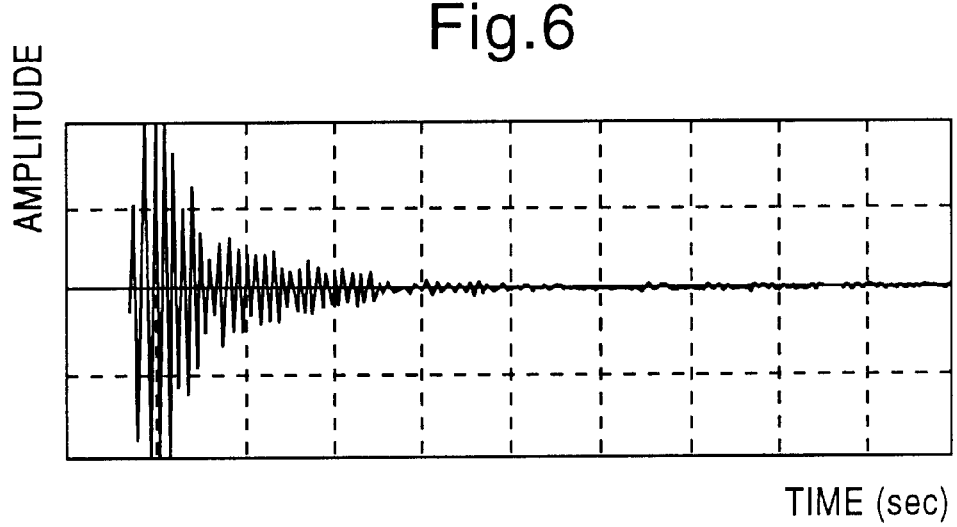
FIG. 6 is a graph showing the free oscillation attenuation waveform of the present inventive article.

FIG. 5 shows the free attenuation waveform of the reference article ①, and FIG. 6 shows the free attenuation waveform of the present inventive article ②. A comparison between these figures also makes it clear that the present inventive article attenuates in a shorter period of time than the reference article, from which it is believed that the echoing of sliding sound during operation can be improved.

As has been described so far, according to the invention, the attenuation characteristics of the slide member can be improved by the presence of resin, so that the sliding sound produced during operation can be reduced. Therefore, when it is used also in the carriage of a printer, a high degree of calmness is obtained. Further, since the slide member is a sintered body, it can be shaped as by a press after sintering; thus, a slide member with high accuracy can be obtained at low cost.

What is claimed is:

1. A slide member which is slidably glided on the outer peripheral surface of a shaft, wherein the slide member is produced by adding a thermosetting resin to a metal powder consisting essentially of copper powder, iron powder or a mixture thereof and sintering the same, and wherein the slide member is a sintered body with pores, a portion of which are filled with carbonized resins.

2. A slide member according to claim 1, wherein said mixture of metal powder and resin is sintered at temperatures not less than the temperature at which the resin carbonizes.

3. A slide member according to claim 1 or 2, wherein the thermosetting resin is of the hot-melt type.

4. A slide member according to claim 1 or 2, wherein tin or copper is added to said metal powder to effect liquid phase sintering.

5. A slide member according to claim 1 or 2, wherein the thermosetting resin is added in an amount of 10–50% by volume.

6. A slide member according to claim 1 or 2, wherein the porosity is 5–40% by volume.

7. A slide member according to claim 1 or 2, wherein the molded body of said mixture is sintered, it is further shaped.

8. A slide member according to claim 1 or 2, wherein it has an axial groove in the inner diameter surface.

9. A carriage having the slide member described in claim 1 or 2.

\* \* \* \* \*